(12) United States Patent
Howard et al.

(10) Patent No.: US 11,288,734 B2
(45) Date of Patent: Mar. 29, 2022

(54) INTELLIGENT SHELF DISPLAY SYSTEM

(71) Applicant: Adroit Worldwide Media, Inc., Aliso Viejo, CA (US)

(72) Inventors: Kevin Howard, Aliso Viejo, CA (US); Kurtis Van Horn, Aliso Viejo, CA (US); Emad Mirgoli, Aliso Viejo, CA (US)

(73) Assignee: Adroit Worldwide Media, Inc., Aliso Viejo, CA (US)

( * ) Notice: Subject to any disclaimer, the term of this patent is extended or adjusted under 35 U.S.C. 154(b) by 318 days.

(21) Appl. No.: 16/226,214

(22) Filed: Dec. 19, 2018

(65) Prior Publication Data

US 2019/0188782 A1 Jun. 20, 2019

Related U.S. Application Data

(60) Provisional application No. 62/607,837, filed on Dec. 19, 2017.

(51) Int. Cl.
*G06Q 30/00* (2012.01)
*G06Q 30/06* (2012.01)
(Continued)

(52) U.S. Cl.
CPC ..... *G06Q 30/0643* (2013.01); *G06K 9/00369* (2013.01); *G06Q 30/0639* (2013.01);
(Continued)

(58) Field of Classification Search
None
See application file for complete search history.

(56) References Cited

U.S. PATENT DOCUMENTS 9,990,644 B2 6/2018 Walden
10,373,189 B2 8/2019 Walden
(Continued)

OTHER PUBLICATIONS

Higa, Kyota, Robust Shelf Monitoring Using Supervised Learning for Improving On-Shelf Availability in Retail Stores, Jun. 17, 2019, Sensors (Year: 2019).*

(Continued)

*Primary Examiner* — Jeffrey A. Smith
*Assistant Examiner* — Timothy J Kang
(74) *Attorney, Agent, or Firm* — Ravi Mohan; Rutan & Tucker, LLP (57) ABSTRACT

An apparatus and a method are provided for an intelligent shelf display system that creates an intimate customer experience and helps retailers increase operational efficiencies. The system is comprised of a cabinet top to display animated and/or graphical content and is mounted on top of in-store shelves. A fascia to display animated and/or graphical content is extended along each shelf of the in-store shelves. A media player executes multiple media files that are simultaneously displayed on the cabinet top and the fascia. The cabinet top and the fascia display content to entice customers to approach the shelves, and then the fascia switch to displaying pricing information once a customer is nearby. A proximity sensor detects the presence of the customer. Stock sensors track the inventory stocked on the in-store shelves. Alerts are created once the merchandise remaining on the shelves is reduced to a predetermined minimum threshold quantity.

10 Claims, 8 Drawing Sheets

(51) Int. Cl.
   *G06K 9/00* (2022.01)
   *G09F 3/20* (2006.01)
   *G09F 27/00* (2006.01)
(52) U.S. Cl.
   CPC .............. *G09F 3/204* (2013.01); *G09F 3/208* (2013.01); *G09F 2027/001* (2013.01)

(56) References Cited

U.S. PATENT DOCUMENTS

| | | | |
|---|---|---|---|
| 10,373,190 B2 | 8/2019 | Walden | |
| 2008/0046345 A1 | 2/2008 | Serre | |
| 2008/0055087 A1 | 3/2008 | Horii et al. | |
| 2014/0249928 A1 | 9/2014 | McMillan et al. | |
| 2016/0034244 A1* | 2/2016 | Howard | G06Q 30/0601 345/156 |
| 2016/0106236 A1 | 4/2016 | Kwiatek et al. | |
| 2016/0371735 A1 | 12/2016 | Walden | |
| 2017/0011427 A1 | 1/2017 | Walden | |
| 2017/0011429 A1 | 1/2017 | Walden | |
| 2017/0017290 A1 | 1/2017 | Walden | |
| 2017/0017994 A1 | 1/2017 | Walden | |
| 2017/0018004 A1 | 1/2017 | Walden | |
| 2017/0018005 A1 | 1/2017 | Walden | |
| 2017/0018006 A1 | 1/2017 | Walden | |
| 2017/0019764 A1 | 1/2017 | Walden | |
| 2017/0053315 A1 | 2/2017 | Walden | |
| 2017/0053316 A1 | 2/2017 | Walden | |
| 2017/0068978 A1 | 3/2017 | Walden | |
| 2017/0124603 A1* | 5/2017 | Olson | H04W 4/02 |
| 2018/0165711 A1* | 6/2018 | Montemayor | G06Q 30/0269 |
| 2018/0166046 A1* | 6/2018 | Yamazaki | G06K 9/00664 |
| 2019/0206400 A1* | 7/2019 | Cui | G05D 1/0016 |

OTHER PUBLICATIONS

"AWM Automated Inventory Intelligence (Aii) Promo" published by AWM Smart Shelf, Jan. 20, 2017 [retrieved Feb. 11, 20191 Retrieved from the Internet: <URL: https:/lwww.youtube.com/watch?v=RFkc4nXtKe Y>.

"DSE 2017: Adroit Worldwide Media Explains its Smart LED Retail Solutions" uploaded by rAVe Publications, Mar. 31, 2017 [retrieved Feb. 11, 2019] Retrieved from the Internet: <URL: https://www.youtube.com/watch?v=ULucc1 ZVBnM>.

International Search Report and Written Opinion, PCT Application No. PCT/US2018/066564, dated Mar. 21, 2019.

\* cited by examiner

INTELLIGENT SHELF DISPLAY SYSTEM

PRIORITY

This application claims the benefit of priority to U.S. Provisional Application No. 62/607,837, filed Dec. 19, 2017, the entirety of which is being incorporated herein by reference.

FIELD

The field of the present disclosure generally relates to merchandising systems. More particularly, the field of the invention relates to an apparatus and a method for an intelligent shelf display system that creates an intimate customer experience and helps retailers increase operational efficiencies.

BACKGROUND

Retail store environments are ever challenging. Consumers typically are confronted with pricing and information about a continuously increasing number of competitors and brands, including information about pricing, labeling, promotions, and the like. Traditionally, this information has been provided using print systems, such as slide-in paper systems, plastic label systems, and adhesive label systems. However, consumers are increasingly confounded by the sheer volume of printed information displayed in retail environments, and thus a growing number of consumers are turning to online shopping for day-to-day purchases. Furthermore, a retailer's overall performance and profits are significantly impacted by the challenge of getting the right products to the right stores at the right time. Therefore, a continuing need exists for solutions that help retailers increase operational efficiencies, create intimate customer experiences, streamline processes, and provide real-time understanding of customer behavior in the store.

SUMMARY

Disclosed here in is an intelligent shelf display system, including a cabinet top configured to display animated and/or graphical content and mounted on top of in-store shelves, a fascia configured to display graphical content and extending along each shelf including the in-store shelves, a data processing system including a media player configured to simultaneously execute a multiplicity of media files that are displayed on the cabinet top and the fascia, a proximity sensor to detect the presence of a potential customer, and one or more stock sensors to track inventory stocked on the in-store shelves.

In a further embodiment, the cabinet top and the fascia display animated graphical content so as to entice potential customers to approach the shelves, and the fascia display pricing and other information pertaining to the merchandise on the shelves once a potential customer approaches the shelves.

In additional embodiments, the cabinet top and the fascia may be attached to pre-installed shelves by a suitable fastening means.

In a still further embodiment, the fascia and the cabinet top are each comprised of a multiplicity of small light emitting diodes ("LED") arrays that are coupled together so as to tessellate each of the cabinet top and the fascia, such that the fascia and the cabinet top extend along the length of the shelves.

In a still yet further embodiment, the small LED arrays may be comprised of any number of LED pixels that are organized into an arrangement extending along the cabinet top and the fascia along the entire length of the shelves.

In a yet further embodiment, the cabinet top and the fascia may be configured to display graphical content indicating product location to potential customers.=

In still another embodiment, the animated and/or graphical content is comprised of a single animated image that fills the entirety of the cabinet top In a yet additional embodiment, the animated and/or graphical content includes, multiple animated images that are arranged to cover the area of the cabinet top.

In a still yet additional embodiment, the fascia cooperates with the cabinet top to display images that appear to be spread across the height and length of the shelves.

In more additional embodiments, the fascia dynamically changes the displayed graphics based upon signals generated from the proximity sensor associated with the presence of a first customer within a first proximity of a shopping area.

Still more embodiments comprise an intelligent shelf display system, including a first cabinet top configured to display graphical content and mounted on top of a first in-store shelving unit the shelving unit includes a first plurality of shelves, a first plurality of fasciae configured to display graphical content and extending along the outer length of each of the first plurality of shelves including the first in-store shelving unit, a first proximity sensor configured to generate proximity data upon detecting the presence of a potential customer, a first plurality of stock sensors configured to generate inventory data in response to tracking inventory stocked on the first in-store shelving unit a second cabinet top configured to display graphical content and mounted on top of a second in-store shelving unit the shelving unit includes a second plurality of shelves, a second plurality of fasciae configured to display graphical content and extending along the outer length of each of the second plurality of shelves including the second in-store shelving unit, a second proximity sensor configured to generate proximity data upon detecting the presence of a potential customer, a second plurality of stock sensors configured to generate inventory data in response to tracking inventory stocked on the second in-store shelving unit, and a data processing system including a media player configured to simultaneously execute a multiplicity of media files that are configured to be displayed on the first and second cabinet tops and the first and second fasciae.

In more further embodiments, the data processing system is commutatively coupled to the first cabinet top, the second cabinet top, the first plurality of fasciae, the second plurality of fasciae, the first proximity sensor, the second proximity sensor, the first plurality of stock sensors, and the second plurality of stock sensors.

In additional further embodiments, the data processing system also includes a wireless communication system and the commutative coupling of the data processing system is achieved through the wireless communication system.

In further additional embodiments, the first and second cabinet tops and first and second plurality of fasciae are configured to display graphic content via a plurality of light emitting diode (LED) arrays coupled to the cabinet tops and fasciae.

In still yet another embodiment, the first and second cabinet tops are coupled together such that the LED arrays associated with the first cabinet top and the LED arrays associated with the second cabinet top tessellate across the coupled first and second cabinet tops such that first and second cabinet tops appear to be a single cabinet top.

In a further embodiment again, the first and second plurality of fasciae are coupled together such that the LED arrays associated with the first plurality of fasciae and the LED arrays associated with the second plurality of fasciae tessellate across the coupled first and second plurality of fasciae such that first and second plurality of fasciae appear to be a single plurality of fasciae.

In still more embodiments, the media files configured to be displayed on the first and second cabinet top comprise graphical content that is configured to play as a first and second media file across the first and second cabinet top simultaneously such that the first and second media file comprise contents that when played across the first and second cabinet top simultaneously appear to be playing a single media file across a single cabinet top.

In still further additional embodiments, the data processing system is configured to display media files at dynamic resolutions based upon the combined resolution of any selection of cabinet tops.

In a yet further embodiment, the media files configured to be displayed on the first and second plurality of fasciae comprise graphical content that is configured to play as a first and second media file across the first and second plurality of fasciae simultaneously such that the first and second media file comprise contents that when played across the first and second plurality of fasciae simultaneously appear to be playing a single media file across a single cabinet top.

In more additional embodiments, the data processing system is configured to display media files at dynamic resolutions based upon the combined resolution of any selection of fasciae.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first shelf," may be made. However, the specific numeric reference should not be interpreted as a literal sequential order but rather interpreted that the "first shelf" is different than a "second shelf." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for an intelligent shelf display system that creates an intimate customer experience and helps retailers increase operational efficiencies. The intelligent shelf display system is comprised of a cabinet top configured to display animated and/or graphical content and mounted on top of in-store shelves. A fascia configured to display animated and/or graphical content is extended along each shelf comprising the in-store shelves. A data processing system includes a media player that is configured to simultaneously execute a multiplicity of media files that are displayed on the cabinet top and the fascia. In a number of embodiments, the data processing system is configured to display a single media file on each cabinet top and/or fasciae and the contents and/or synchronization of the media file can give the illusion of a single, large cabinet top and/or fasciae when multiple intelligent shelving systems are coupled together. In some embodiments, the data processing system may have a plurality of media files associated with different resolutions and select media files for display based upon the combined resolution of any given number of intelligent shelving systems that are coupled together. In certain embodiments, the data processing system may dynamically alter the media file contents in order to better display the graphical content on coupled intelligent shelving systems. It would be understood by those skilled in the art that such dynamic altering may be done via a set of pre-determined rules associated with the content of the media file as well as the ultimate resolution that the media files would be played at. The cabinet top and the fascia are configured to display content so as to entice potential customers to approach the shelves, and then the fascia may switch to displaying pricing and other information pertaining to the merchandise on the shelves once a potential customer approaches the shelves. A proximity sensor comprising the intelligent shelf display system is configured to detect the presence of the potential customer. Further, one or more stock sensors may be configured to track the inventory stocked on the in-store shelves.

The intelligent shelf display system may create one or more alerts once the merchandise remaining on the shelves is reduced to a predetermined minimum threshold quantity. The intelligent shelf display may also be coupled together to create larger, uniform shelf displays which can be networked together to share digital communications.

Figure 1:
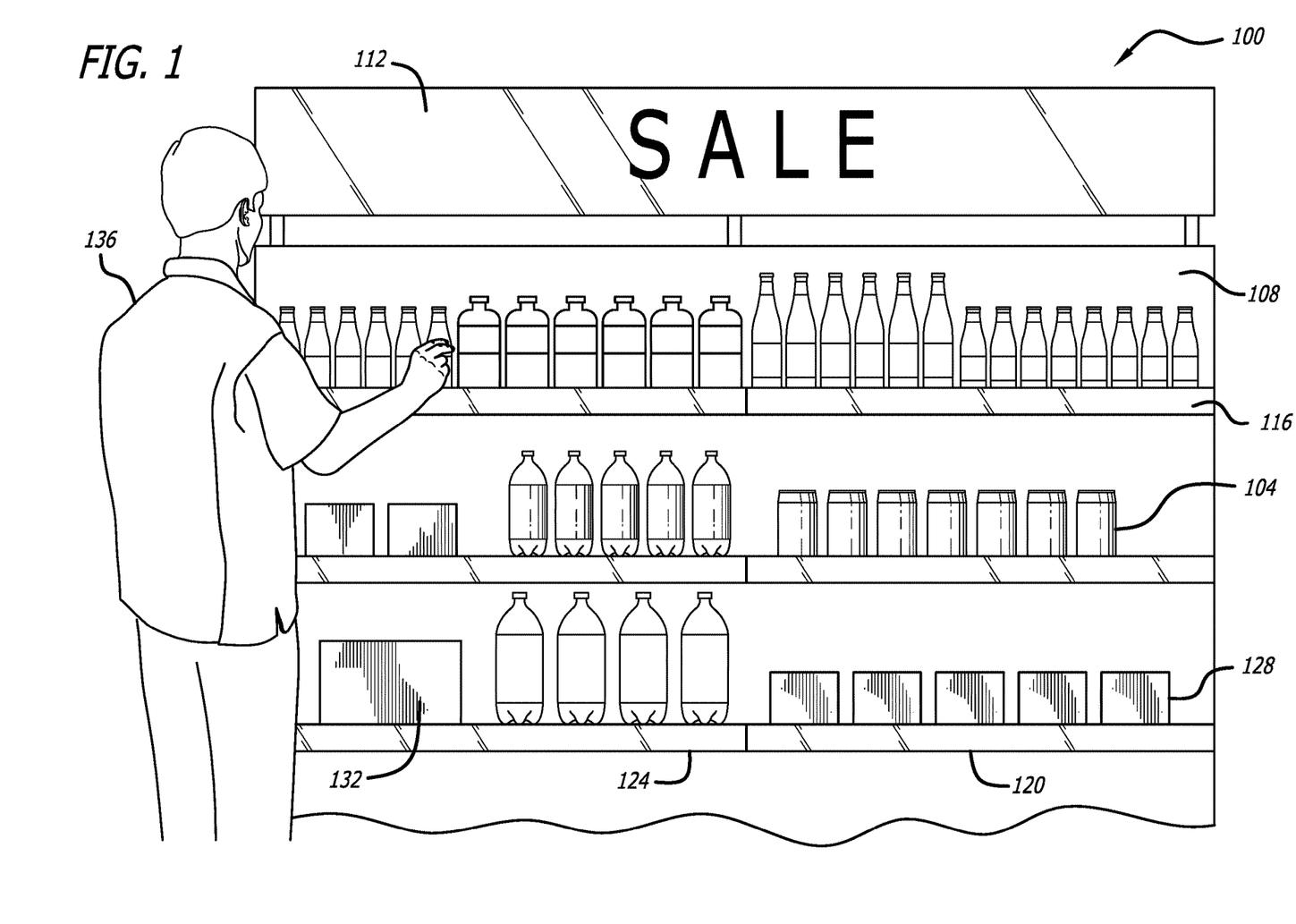
FIG. 1 illustrates an exemplary embodiment of an intelligent shelf display system that may be used to promote merchandise to nearby potential customers in according with an embodiment of the present disclosure.

FIG. 1 illustrates an exemplary embodiment of an intelligent shelf display system 100 that may be used to promote merchandise to nearby potential customers in according with the present disclosure. As shown in FIG. 1, the intelligent shelf display system 100 may reside in a stand-by, merchandise promotion state in absence of customers. During the merchandise promotion state, the intelligent shelf display system 100 shows animated and/or graphical content to draw the attention of potential customers to the merchandise 104 that is stocked on shelves 108. As will be recognized, the shelves 108 may be typical aisle shelves that are used to stock merchandise 104 in many retail locations.

In an embodiment, the intelligent shelf display system 100 is comprised of a cabinet top 112 and one or more fascia 116 that are coupled with the shelves 108. In some embodiments, a cabinet footing may also be incorporated into the intelligent shelf display system 100. The cabinet top 112 and fascia 116 may be attached to the shelves 108 by way of any fastening means deemed suitable, such as, by way of non-limiting example, magnets, adhesives, brackets, hardware fasteners, and the like. In this way, the intelligent shelf display system 100 may be configured to be installed onto pre-existing/pre-installed shelving units. In other embodiments, the intelligent shelf display system 100 can be provided as an entire unit for installation. The fascia 116 and the cabinet top 112 are each comprised of one or more arrays of light emitting diodes (LEDs) that are configured to display animated content. Any of the fascia 116 and the cabinet top 112 may be comprised of relatively smaller LED arrays that may be coupled together so as to tessellate the cabinet top 112 and the fascia 116, such that the fascia and cabinet top desirably extend along the length of the shelves 108 to visually present as a single, uniform display. The smaller LED arrays may be comprised of any number of LED pixels, and the pixels may be organized into any arrangement to conveniently extend the cabinet top 112 and the fascia 116 along the length of the shelves 108. In some embodiments, for example, a first dimension of the smaller LED arrays may be comprised of about 132 or more pixels. In some embodiments, a second dimension of the smaller LED arrays may be comprised of about 62 or more pixels. Of course, it would be evident to those skilled in the art that a variety of pixel resolutions could be accommodated based on the desired application, improved technology, and/or budgetary needs.

As stated above, the cabinet top 112 and the fascia 116 may be configured to display animated and/or graphical content to attract the attention of potential customers. As shown in FIG. 1, the cabinet top 112 may display desired content that extends along the length of the shelves 108. The desired content may be comprised of a single animated or graphical image that fills the entirety of the cabinet top 112, or the desired content may be a group of smaller, multiple animated or graphical images that cover the area of the cabinet top 112. In some embodiments, the fascia 116 may cooperate with the cabinet top 112 to display either a single image or multiple images that appear to be spread across the height and length of the shelves 108.

In some embodiments, the cabinet top 112 may display animated or graphical content selected to attract the attention of potential customer to one or more products comprising the merchandise 104. Thus, the content shown on the cabinet top 112 may be specifically configured to draw the potential customers to approach the shelves 108. The content shown on the cabinet top 112, as well as the fascia 116, may be dynamically changed to engage and inform customers of ongoing sales, promotions, and advertising. As will be appreciated, these features offer brands and retailers a way to increase sales locally by offering customers a personalized campaign that may be easily changed quickly.

Moreover, portions of the fascia 116 may display images of brand names and/or symbols representing products stocked on the shelves 108 nearest to each portion of the fascia. For example, in an embodiment, a single fascia 116 may be comprised of a first portion 120 and a second portion 124. The first portion 120 may display an image of a brand name of a first product 128 that is stocked directly above the first portion 120, while the second portion 124 may display an image of a brand name of a second product 132 that is stocked directly above the second portion 124. It is contemplated, therefore, that the fascia 116 extending along each of the shelves 108 may be sectionalized to display images corresponding to each of the products stocked on the shelves 108. It is further contemplated that the displayed images will advantageously simplify customers quickly locating desired products.

In an embodiment, the animated and/or graphical images displayed on the cabinet top 112 and the fascia 116 are comprised of media files that are executed by way of a suitable media player. The media player preferably is configured to simultaneously play any desired number of media files that may be displayed on the smaller LED arrays. In some embodiments, each of the smaller LED arrays may display one media file being executed by the multiplayer, such that a group of adjacent smaller LED arrays combine to display the desired images to the customer. In additional embodiments, the media files to be displayed on the LED array may be processed at either the LED unit or within a display controller to determine which portion(s) of the media file should be displayed within the LED pixels. Still, in some embodiments, base video may be stretched to fit any of various sizes of the smaller LED arrays, and/or the cabinet top 112 and fascia 116. It should be appreciated, therefore, that the multiplayer disclosed herein enables implementing a single media player per aisle in-store instead relying on multiple media players dedicated to each aisle.

Figure 2:
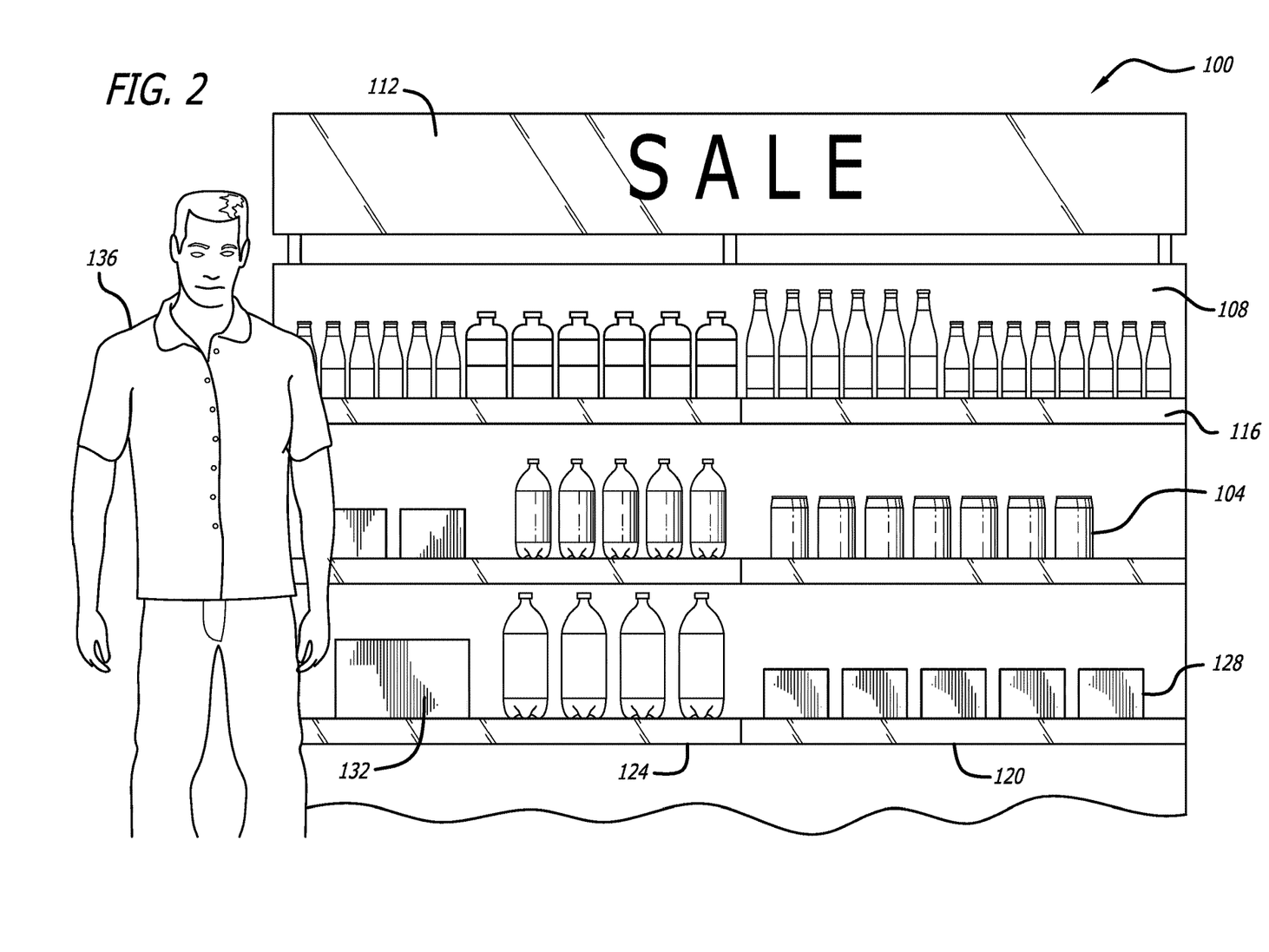
FIG. 2 illustrates the intelligent shelf display system of FIG. 1 in the presence of a customer.

FIG. 2 illustrates the intelligent shelf display system 100 in the presence of a potential customer 136. As stated hereinabove, the cabinet top 112 and the fascia 116 may display animated and/or graphical content so as to entice the customer 136 to approach the shelves 108. Once the potential customer 136 approaches the shelves 108, as shown in FIG. 2, the intelligent shelf display system 100 may begin displaying pricing and other information pertaining to the merchandise 104 that is stocked on the shelves 108. For example, as shown in FIG. 1, the first portion 120 displays the brand name of the first product when the customer 136 is absent. When the customer 136 approaches, however, the first portion 120 begins displaying pricing for each of the first products 128 stocked adjacent to the first portion. Similarly, in the presence of the customer 136, the second portion 124 switches from displaying the brand name for the second products 132 to displaying pricing and other information related to each of the second products 132 stocked next to the second portion 124. Once the customer 136 leaves, the intelligent shelf display system 100 may return to showing the content illustrated in FIG. 1. It is contemplated that a suitable sensor, such as a camera, may be used to detect the proximity of the customer 136, as described herein. In further embodiments, the intelligent shelf display system 100 may receive data related to customer proximity by signals received from proximity sensors located on additional intelligent shelf display systems.

As will be appreciated, the intelligent shelf display system 100 is configured to provide customers with an engaging, dynamic and efficient in-store shopping experience that is reminiscent of an online shopping experience. The intelligent shelf display system 100 may also provide metrics to merchandize manufacturers including, but not limited to, number of shoppers, live inventory levels, engagement data, and A/B sales test data. In certain embodiments, this metric data may be sold/and or traded to merchandise manufacturers. It is contemplated that the intelligent shelf display system 100 may be incorporated into display areas other than in retail store environments, such as, by way of non-limiting example, schedules for airplanes, trains, and buses, billboards, bus side panels, theaters, casinos, sports venues, and the like. As such, the intelligent shelf display system 100 is not limited to being incorporated into aisle shelves, such as the shelves 108, but rather the intelligent shelf display system may be incorporated into any display area that is suitable for showing animated and/or graphical content.

Figure 3:
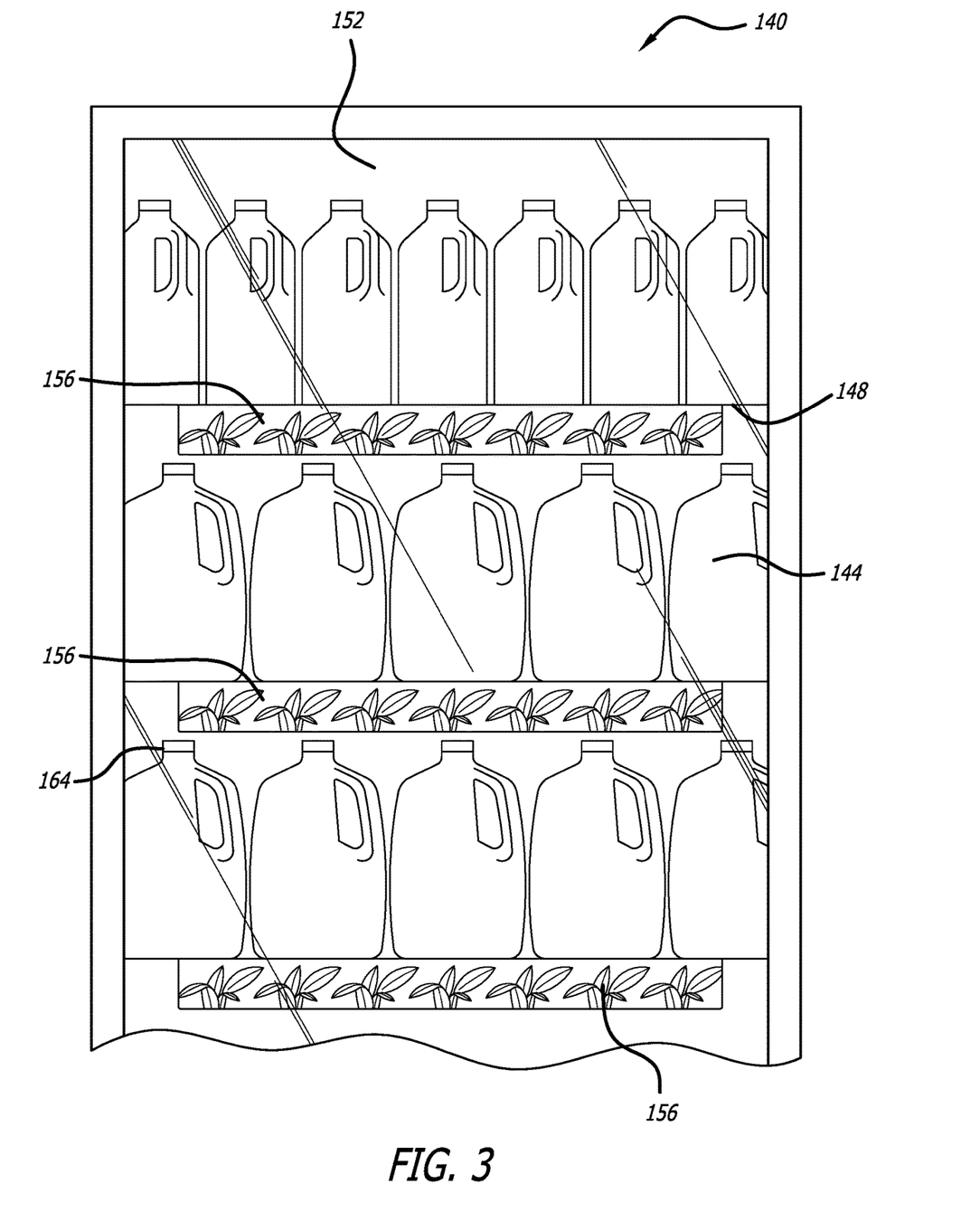
FIG. 3 illustrates an exemplary embodiment of an intelligent refrigerated display case according to an embodiment of the present disclosure.

FIG. 3, for example, illustrates an exemplary embodiment of an intelligent refrigerated display system 140 according to the present disclosure. The intelligent refrigerated display system 140 generally includes merchandise 144 stocked onto shelves 148 and housed in a cool environment that may be accessed by way of a glass door 152. A fascia 156 is disposed along the length of each of the shelves 148. The fascia 156 are substantially the same as the fascia 116, shown in FIGS. 1-2, with the exception that the fascia 156 are relatively shorter in length than the fascia 116, and the fascia 156 reside in a refrigerated environment. As such, the fascia 156 may display one or more animated and/or graphical images in absence of nearby customers. The images may be of a merchandise promotional variety.

Figure 4:
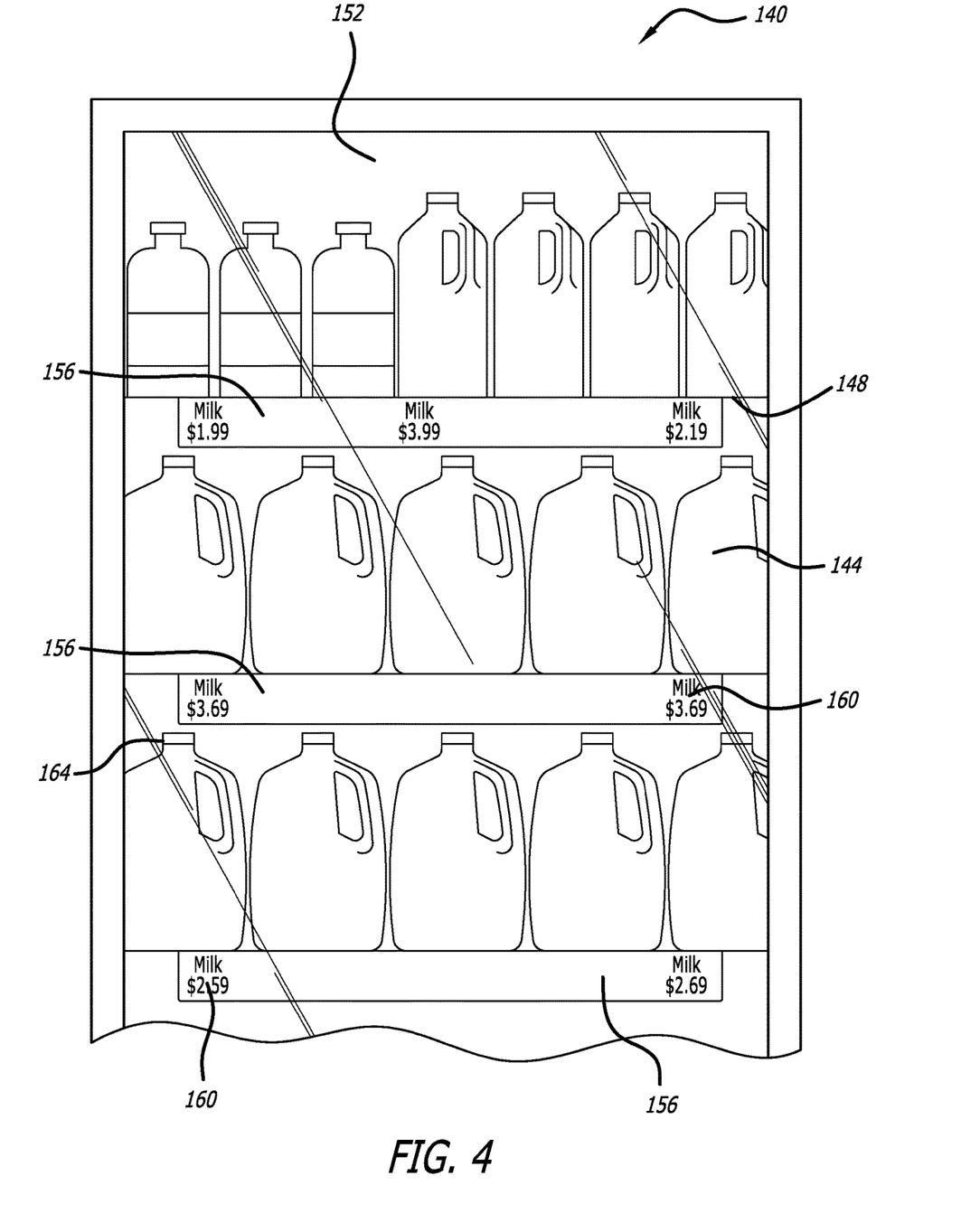
FIG. 4 illustrates the intelligent refrigerated display case of FIG. 3 displaying pricing and detailed information for merchandise stocked on the shelves when in the presence of a customer.

Once a potential customer approaches, as described with respect to FIGS. 1-2, the intelligent refrigerated display system 140 may detect the presence of the customer and then switch the fascia 156 to display pricing and other information related to the merchandise 144. As shown in FIG. 4, in the presence of the customer the fascia 156 display a pricing image 160 for each product 164 that is stocked on the shelves 148. The pricing images 160 include specific pricing and detailed information for each of the products 164. As will be appreciated, the intelligent refrigerated display system 140 may be configured to switch back to displaying the merchandise promotional content once the customer leaves the area proximal to the shelves 148.

Figure 5:
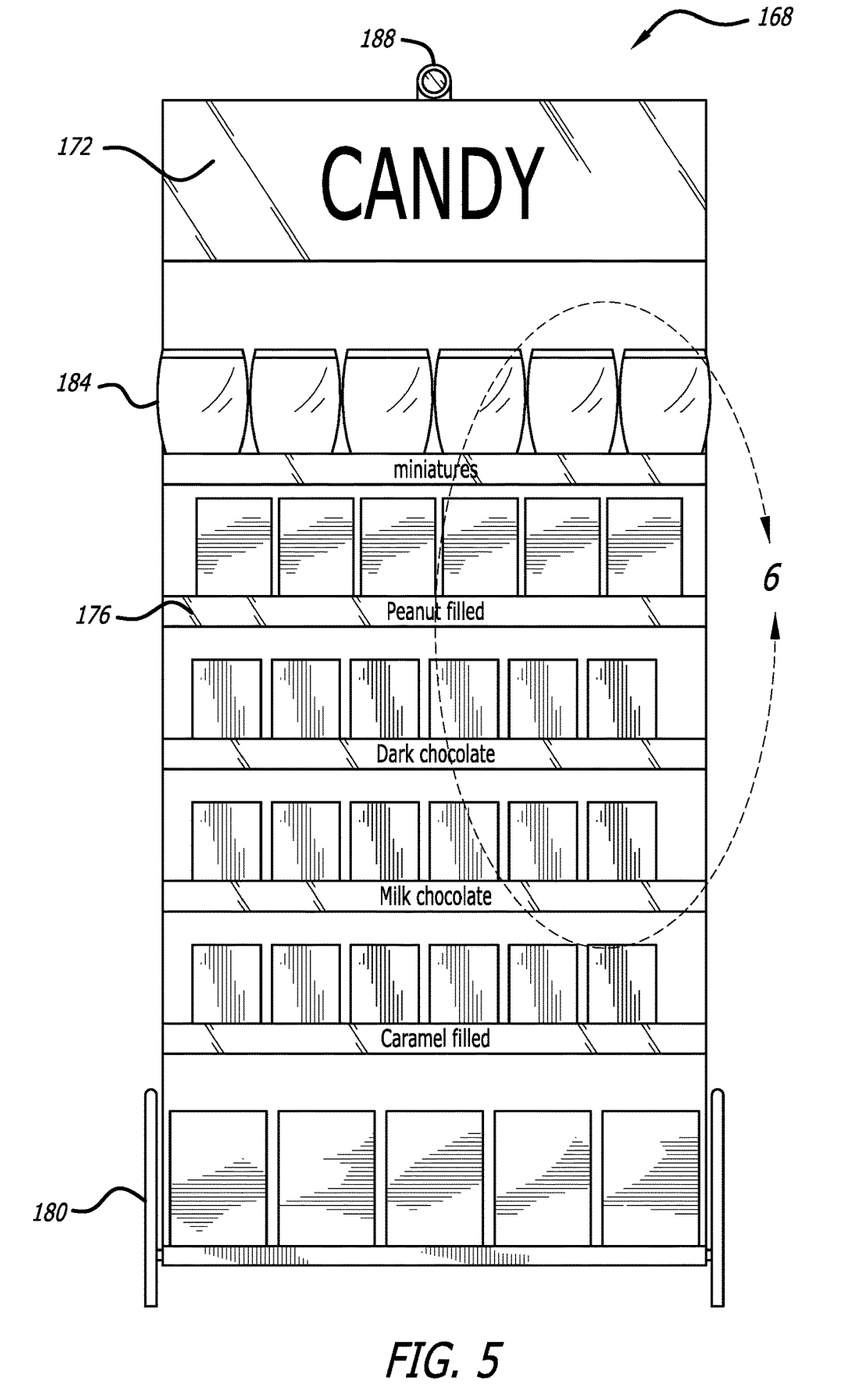
FIG. 5 illustrates an exemplary embodiment of an intelligent aisle-end display system in accordance with an embodiment of the present disclosure.

FIG. 5 illustrates an exemplary embodiment of an intelligent aisle-end ("end cap") display system 168 in accordance with the present disclosure. The intelligent aisle-end display system 168 is substantially identical to the intelligent shelf display system 100, shown in FIGS. 1-2, with the exception that a cabinet top 172 and fascia 176 are configured for use with aisle-end shelves 180 that are shorter than the shelves 108. As shown in FIG. 5, each of the fascia 176 may display animated and/or graphical content related to merchandise 184 that is stocked on the aisle-end shelves 180. The content displayed by the cabinet top 172 and the fascia 176 may be configured to attract the attention of potential customers and promote the sale of the merchandise 184.

The intelligent aisle-end display system 168 may be configured to detect the presence of potential customers by way of a proximity sensor 188. In an embodiment, the proximity sensor 188 is comprised of a camera advantageously positioned to detect the presence of customers. It is contemplated that the proximity sensor 188 may be located anywhere within the intelligent aisle-end display system 168 that provides a suitable field of view to detect the presence of customers. Further, it is contemplated that the proximity sensor 188 is not to be limited to cameras, but rather the proximity sensor 188 may be comprised of any type of sensor whereby the proximity of customers may be detected, such as, by way of non-limiting example, sensors that detect motion, sound, heat, manual switches, and the like, without limitation. Finally, in some environments, the camera utilized for use as a proximity sensor, may be utilized to deliver image data for alternate uses including, but not limited to, customer recognition, loss prevention, item tracking, and/or ambient light level measurements.

Figure 6:
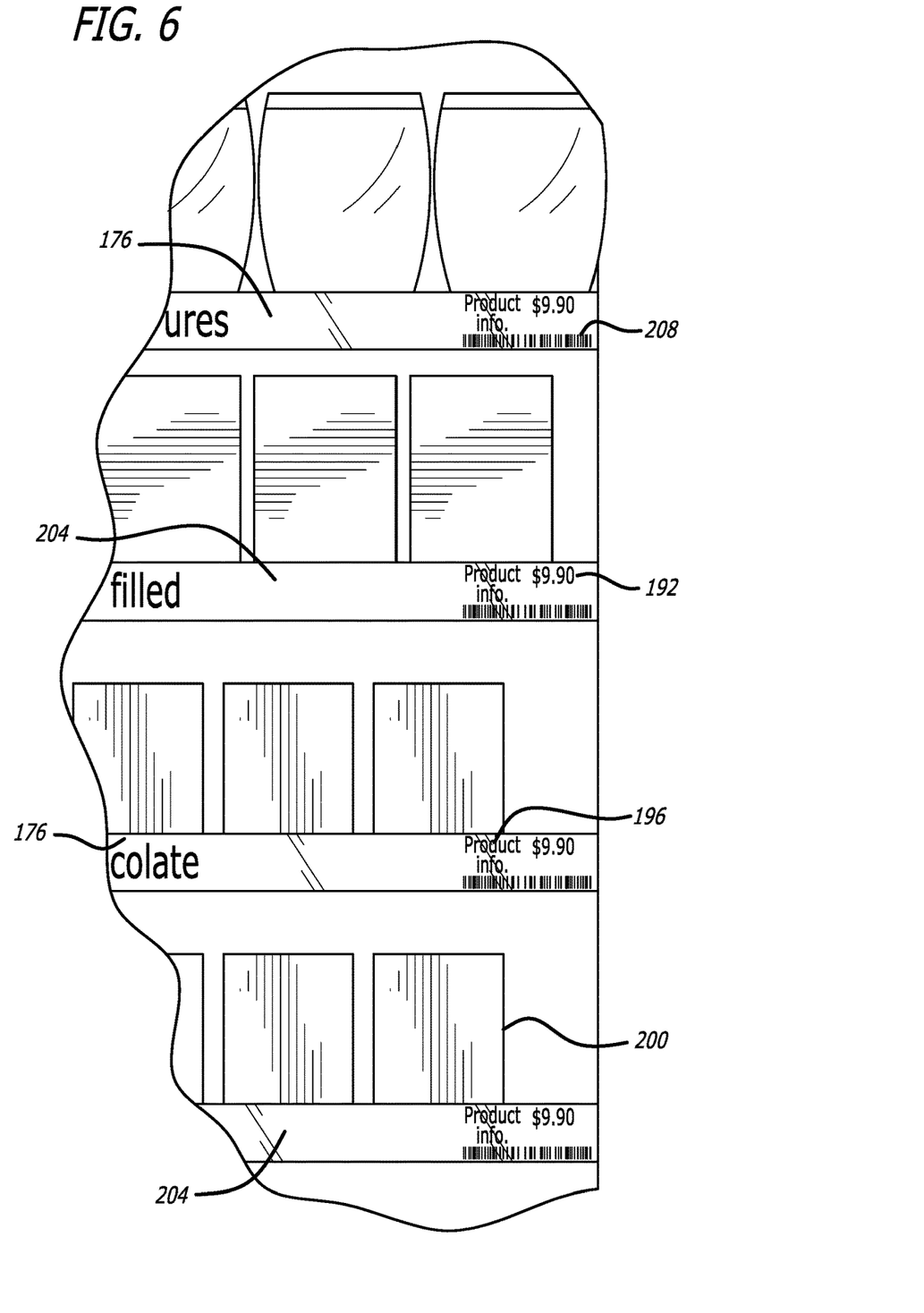
FIG. 6 illustrates a close-up view of a portion of the intelligent aisle-end display system of FIG. 5 after a proximity sensor has detected the presence of a customer.

FIG. 6 illustrates a close-up view of a portion of the intelligent aisle-end display system 168 after the proximity sensor 188 has detected the presence of a potential customer. As shown in FIG. 5, each of the aisle-end shelves 180 contains a specific product. As such, an end portion of each fascia 176 displays pricing 192 and product information 196 pertaining to the products 200 stocked on each of the aisle-end shelves 180. In the illustrated embodiment of FIGS. 5-6, the fascia 176 includes a graphic pointer 204 indicating the locations of the products to which the pricing 192 applies. Further, the pricing 192 and the product information 196 may include a barcode 208 that is associated with each of the products. In certain embodiments, the intelligent aisle-end display system 168 may be in communication with data relating to stock levels and/or sales promotions which may facilitate dynamic pricing adjustments of the pricing 192 or any other display data. It would be evident to those skilled in the art, that the above embodiments relating to the aisle-end display 168 may be applied to any of the other disclosed embodiments, including the embodiments discussed above in FIGS. 1-4.

In addition to attracting customers and promoting the sale of merchandise, any of the intelligent display systems 100, 140, 168 may be implemented in an on-shelf inventory tracking capacity. In some embodiments, for example, one or more stock sensors may be positioned advantageously in various locations near merchandise stocked on shelves so as to detect the quantities of products remaining on the shelves. Once the stock remaining on the shelves reaches a predetermined minimum threshold, an alert may be sent to store employees indicating that the shelves need to be restocked.

Figure 7:
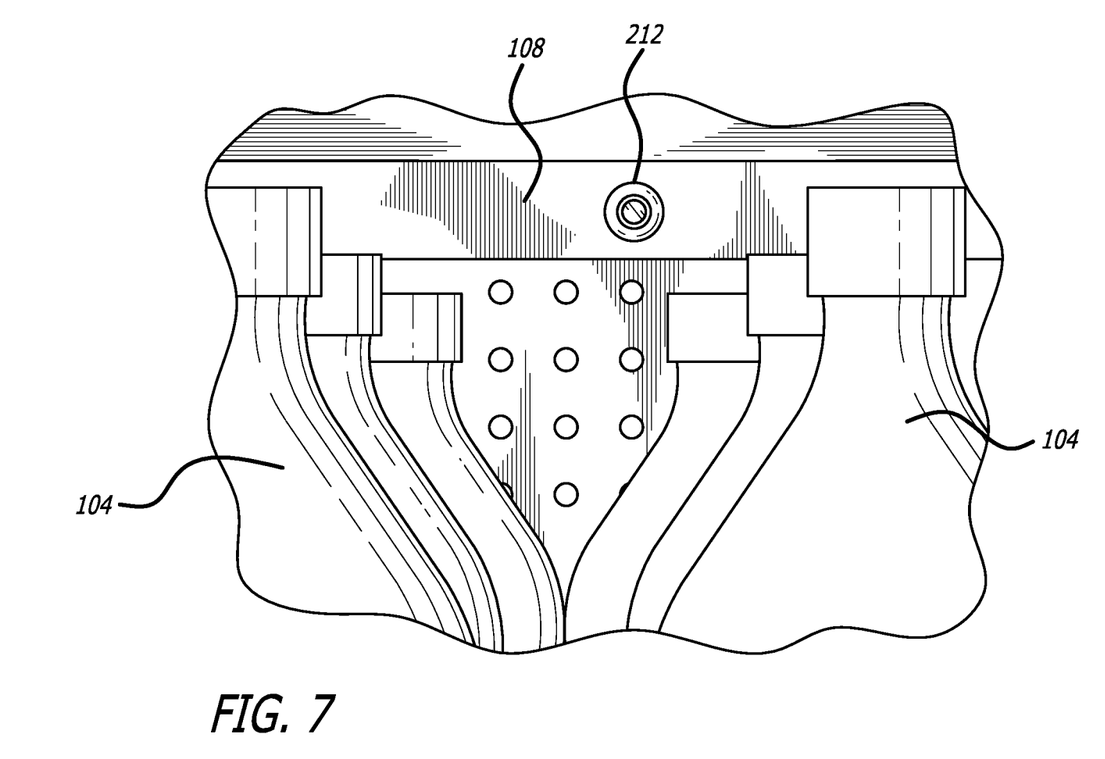
FIG. 7 illustrates an exemplary embodiment of a stock sensor comprising a component of an intelligent shelf display system and positioned near merchandise that is stocked on shelves.

FIG. 7 illustrates an exemplary embodiment of a stock sensor 212 comprising a component of the intelligent shelf display system 100 and positioned near merchandise 104 that is stocked on the shelves 108. In the illustrated embodiment, the stock sensor 212 is comprised of a camera; however, in other embodiments, the stock sensor 212 may be comprised of any sensing device whereby the merchandise stocked on the shelves 108 may be monitored. The stock sensor 212 may be coupled with the shelves 108 by way of any fastening means deemed suitable, such as, by way of non-limiting example, magnets, adhesives, brackets, hardware fasteners, and the like. Further, the location of the stock sensor 212 is not to be limited to the location shown in FIG. 7, but rather it should be understood that one or more stock sensors 212 may be disposed in any location with respect to the shelves 108 whereby the merchandise 104 stocked on the shelves 108 may be monitored. Furthermore, it should be understood that the locations best suited to receive stock sensors 212 will generally depend upon one or more factors, such as, for example, the type of merchandise 104 stocked on the shelves 108, an ability to capture a desired quantity of merchandise 104 within the field of view of the stock sensor 212, as well as the methods whereby customers typically remove merchandise 104 from the shelves 108.

In some embodiment, any of the intelligent display systems 100, 140, 168 may monitor the quantity of merchandise 104 stocked on the shelves 108 by way of the stock sensor 212 and then create an alert once the merchandise remaining on the shelves is reduced to a predetermined minimum threshold quantity. For example, in an embodiment, low-inventory alerts may be created when the remaining merchandise is reduced to 50% and 20% thresholds. The low-inventory alerts may be sent to in-store staff to signal that the shelves 108 need to be restocked with merchandise 104. In some embodiments, the low-inventory alerts may be comprised of real-time images of the shelves 108 so that staff may see the quantity of merchandise 104 remaining on the shelves 108 by way of a computer or a mobile device. In some embodiments, the low-inventory alerts may be sent in the form of text messages in real time to mobile devices carried by in-store staff. As will be appreciated, the low-inventory alerts may entail any communication form that can signal to in-store staff to restock the shelves 108 with additional merchandise. In some embodiments, the cabinet top 112 and/or the fascia 116 may be programmed to generate visual indicators when an item-count is below threshold so that employees may quickly locate and restock the shelves 108 and customers may know when stock may have limited availability.

It is contemplated that any of the intelligent display systems 100, 140, 168 may provide reliable and cost-effective inventory tracking solutions that enable retailers to boost profits by keeping shelves restocked with merchandise quickly enough to keep up with customer demand. The intelligent display systems 100, 140, 168 may accurately track hundreds of SKUs within the individual display systems 100, 140, 168 but may comprise data related to entire store's worth of SKUs within the entirety of the networked display systems. The tracking of the SKUs with shelf location data can aid in the automation of the creation, set-up, and auditing processes of planograms by providing visual cues to workers stocking shelves and to auditors for verifying that the products are matching up with the correct location on the shelves 108. One of the results in a number of these embodiments is that the intelligent display systems 100, 140, and 168 can engage the attention of consumers in the store as well as ease their ability to locate merchandise.

In some embodiments, the proximity sensor 188 and/or the stock sensors 212 are comprised of super-wide-angle, low-light high definition cameras that, with a high degree of accuracy, may track customer behavior at the point of engagement and recognize facial gestures to measure whether customers like a product. It would be understandable by those skilled in the art that the type of camera may be changed based on the needs of the application or upon new technologies being developed that allows, for example, a higher resolution of camera that can provide better tracking data generation. Furthermore, it is contemplated that the sensors 188, 212 may comprise depth tracking features including, but not limited to, cameras that generate depth maps of the shopping environment comprising merchandise and/or customers.

It is contemplated that, in some embodiments, the intelligent display systems 100, 140, 168 may be operated in tandem with one or more suitable software applications that may provide digitized planograms. Thus, specific shelves for each product may be automated, digitized, and highlighted to provide immediate rewards to in-store customers. For example, retailers may increase customer satisfaction and loyalty by providing the customers with a capability to quickly locate products by using a smartphone application. Further, in some embodiments, shelves 108 may be assigned to employees who are alerted when click-to-collect, or other similar online shopping delivery drivers and/or customers are scheduled to pick up items ordered online.

It is further contemplated that the above-mentioned digitized planograms may enable retailers to audit planograms in real time so as to provide brand suppliers with critical information at a desired granularity, such as whether an item was placed on the correct shelf or how moving an item might affect sales, for thousands of items in inventory on hundreds of square feet of shelving across multiple stores and geographical locations. Further, the digitized planograms disclosed herein are contemplated to provide distributors with real-time efficiencies. For example, using the digitized planograms, distributors can be provided data feeds from the intelligent display systems 100, 140, 168 in order to immediately determine fairly precise numbers of products in each store that need restocking, thereby streamlining deliveries and reducing truck fuel and labor costs.

Figure 8:
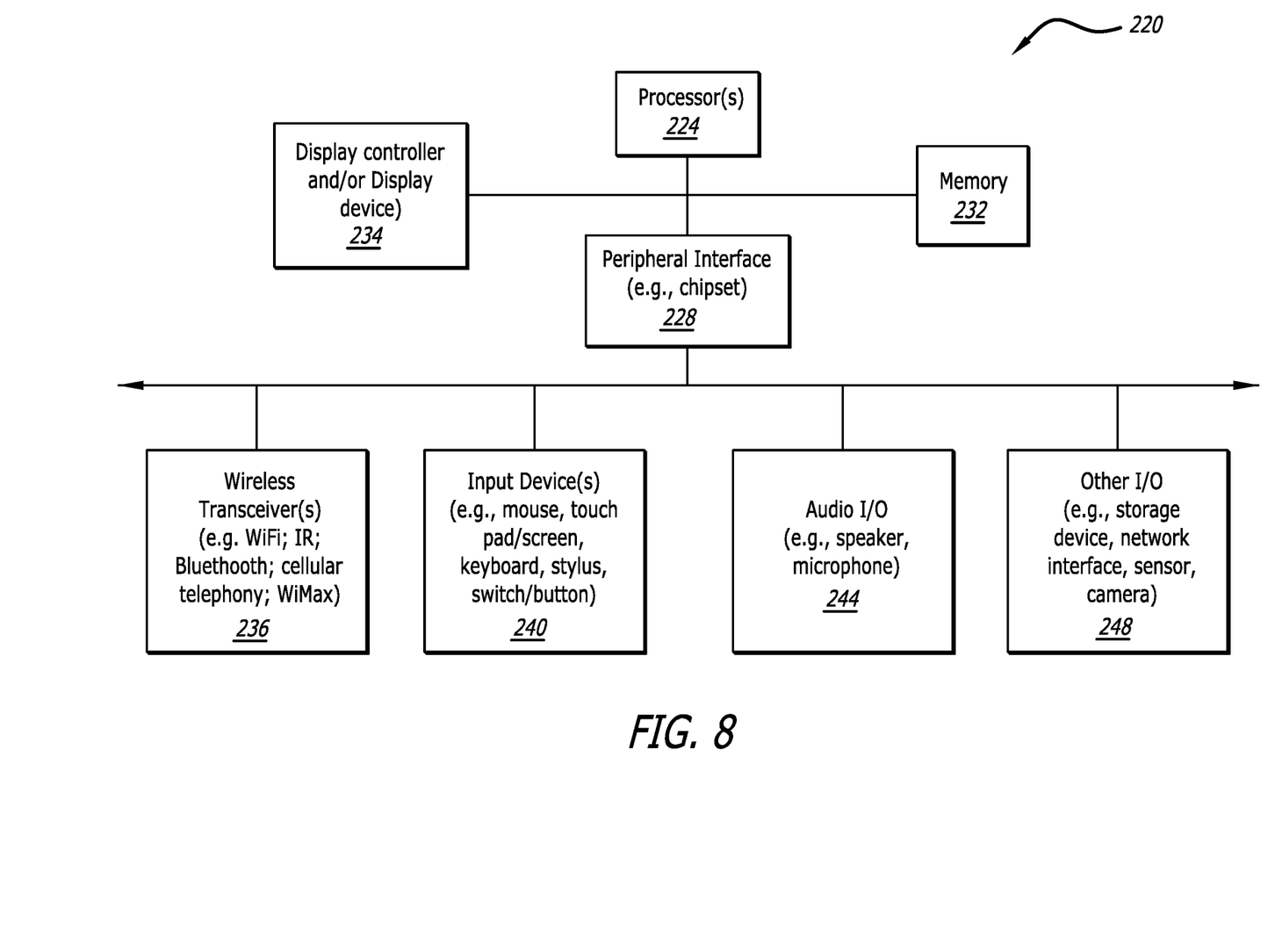
FIG. 8 is a block diagram illustrating an exemplary data processing system that may be used with an intelligent display system according to the present disclosure.

FIG. 8 is a block diagram illustrating an exemplary data processing system 220 which may be used with any of the intelligent display systems 100, 140, 168 to perform any of the processes or methods described herein. System 220 may represent a desktop, a tablet, a server, a mobile phone, a media player, a personal digital assistant (PDA), a personal communicator, a gaming device, a network router or hub, a wireless access point (AP) or repeater, a set-top box, or a combination thereof. In many embodiments, the system 220 may be a dedicated computing device located within the intelligent display system 100, 140, 168. In some embodiments, the system 220 may be communicatively coupled with multiple intelligent display systems 100, 140, 168 and facilitate operation of the multiple intelligent display systems 100, 140, 168.

In an embodiment, illustrated in FIG. 8, system 220 includes a processor 224 and a peripheral interface 228, also referred to herein as a chipset, to couple various components to the processor 224, including a memory 232 and devices 236-248 via a bus or an interconnect. Processor 224 may represent a single processor or multiple processors with a single processor core or multiple processor cores included therein. Processor 224 may represent one or more general-purpose processors such as a microprocessor, a central processing unit (CPU), or the like. More particularly, processor 224 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 224 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 224 is configured to execute instructions for performing the operations and steps discussed herein.

Peripheral interface 228 may include a memory control hub (MCH) and an input output control hub (ICH). Peripheral interface 228 may include a memory controller (not shown) that communicates with a memory 232. The peripheral interface 228 may also include a graphics interface that communicates with graphics subsystem 234, which may include a display controller and/or a display device. The peripheral interface 228 may communicate with the graphics device 234 by way of an accelerated graphics port (AGP), a peripheral component interconnect (PCI) express bus, or any other type of interconnects.

An MCH is sometimes referred to as a Northbridge, and an ICH is sometimes referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 224. In such a configuration, the peripheral interface 228 operates as an interface chip performing some functions of the MCH and ICH. Furthermore, a graphics accelerator may be integrated within the MCH or the processor 224.

Memory 232 may include one or more volatile storage (or memory) devices, such as random access memory (RAM), dynamic RAM (DRAM), synchronous DRAM (SDRAM), static RAM (SRAM), or other types of storage devices. Memory 232 may store information including sequences of instructions that are executed by the processor 224, or any other device. For example, executable code and/or data of a variety of operating systems, device drivers, firmware (e.g., input output basic system or BIOS), and/or applications can be loaded in memory 232 and executed by the processor 224. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 228 may provide an interface to IO devices, such as the devices 236-248, including wireless transceiver(s) 236, input device(s) 240, audio IO device(s) 244, and other IO devices 248. Wireless transceiver 236 may be a WiFi® transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 240 may include a mouse, a touch pad, a touch sensitive screen (which may be integrated with display device 234), a pointer device such as a stylus, and/or a keyboard (e.g., physical keyboard or a virtual keyboard displayed as part of a touch sensitive screen). For example, the input device 240 may include a touch screen controller coupled with a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen. In many embodiments, the peripheral interface also comprises a means to link multiple intelligent display systems 100, 140, 168 together. In this way, data may be transmitted between the intelligent display systems 100, 140, 168 to provide a more unified experience that can facilitate the illusion of the multiple intelligent display systems 100, 140, 168 creating a single intelligent display system. The data that may communicated between the multiple intelligent display systems 100, 140, 168 include, but are not limited to, proximity data, customer data, inventory data, display data, and/or synchronization data configurable for synchronizing the display of multiple intelligent display systems 100, 140, 168.

Audio IO 244 may include a speaker and/or a microphone to facilitate voice-enabled functions, such as voice recognition, voice replication, digital recording, and/or telephony functions. Other optional devices 248 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 8 illustrates various components of a data processing system, it is not intended to represent any particular architecture or manner of interconnecting the components; as such details are not germane to embodiments of the present disclosure. It should also be appreciated that network computers, handheld computers, mobile phones, and other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An intelligent shelf display system, comprising:
   a first cabinet top configured to display graphical content and mounted on top of a first in-store shelving unit wherein the shelving unit comprises a first plurality of shelves;
   a first plurality of fasciae configured to display graphical content and extending along the outer length of each of the first plurality of shelves comprising the first in-store shelving unit;
      wherein at least one fascia comprises a graphic pointer indicating a location and pricing information corresponding to a product;
   a first proximity sensor configured to generate proximity data upon detecting the presence of a potential customer;
   a first plurality of stock sensors configured to generate inventory data in response to tracking inventory stocked on the first in-store shelving unit, wherein at least one of the plurality of stock sensors is coupled with a camera configured to generate a depth map of a shopping environment;
   a second cabinet top configured to display graphical content and mounted on top of a second in-store shelving unit wherein the shelving unit comprises a second plurality of shelves;
   a second plurality of fasciae configured to display graphical content and extending along the outer length of each of the second plurality of shelves comprising the second in-store shelving unit;
   a second proximity sensor configured to generate proximity data upon detecting the presence of a potential customer;
   a second plurality of stock sensors configured to generate inventory data in response to tracking inventory stocked on the second in-store shelving unit; and
   a data processing system including a media player configured to simultaneously execute a multiplicity of media files that are configured to be displayed on the first and second cabinet tops and the first and second fasciae.

2. The system of claim 1, wherein the data processing system is commutatively coupled to:
   the first cabinet top;
   the second cabinet top;
   the first plurality of fasciae;
   the second plurality of fasciae;
   the first proximity sensor;
   the second proximity sensor;
   the first plurality of stock sensors; and
   the second plurality of stock sensors.

3. The system of claim 2, wherein the data processing system further comprises a wireless communication system and the commutative coupling of the data processing system is achieved through the wireless communication system.

4. The system of claim 1, wherein the first and second cabinet tops and first and second plurality of fasciae are configured to display graphic content via a plurality of light emitting diode (LED) arrays coupled to the cabinet tops and fasciae.

5. The system of claim 4, wherein the first and second cabinet tops are coupled together such that the LED arrays associated with the first cabinet top and the LED arrays associated with the second cabinet top tessellate across the coupled first and second cabinet tops such that first and second cabinet tops appear to be a single cabinet top.

6. The system of claim 4, wherein the first and second plurality of fasciae are coupled together such that the LED arrays associated with the first plurality of fasciae and the LED arrays associated with the second plurality of fasciae tessellate across the coupled first and second plurality of fasciae such that first and second plurality of fasciae appear to be a single plurality of fasciae.

7. The system of claim 5, wherein the media files configured to be displayed on the first and second cabinet top comprise graphical content that is configured to play as a first and second media file across the first and second cabinet top simultaneously such that the first and second media file comprise contents that when played across the first and second cabinet top simultaneously appear to be playing a single media file across a single cabinet top.

8. The system of claim 5, wherein the data processing system is configured to display media files at dynamic resolutions based upon the combined resolution of any selection of cabinet tops.

9. The system of claim 6, wherein the media files configured to be displayed on the first and second plurality of fasciae comprise graphical content that is configured to play as a first and second media file across the first and second plurality of fasciae simultaneously such that the first and second media file comprise contents that when played across the first and second plurality of fasciae simultaneously appear to be playing a single media file across a single cabinet top.

10. The system of claim 6, wherein the data processing system is configured to display media files at dynamic resolutions based upon the combined resolution of any selection of fasciae.

* * * * *